United States Patent
Russell et al.

(10) Patent No.: US 10,531,192 B2
(45) Date of Patent: Jan. 7, 2020

(54) SHIELDED HEADPHONES

(71) Applicants: Mark Russell, Naples, FL (US); Zhong Gui Bin, DongGuang (CH); Alberto de Lucio, Naples, FL (US)

(72) Inventors: Mark Russell, Naples, FL (US); Zhong Gui Bin, DongGuang (CH); Alberto de Lucio, Naples, FL (US)

(73) Assignee: LINSTOL USA, LLC, Naples, FL (US)

( * ) Notice: Subject to any disclaimer, the term of this patent is extended or adjusted under 35 U.S.C. 154(b) by 0 days.

(21) Appl. No.: 16/110,666

(22) Filed: Aug. 23, 2018

(65) Prior Publication Data

US 2019/0313188 A1 Oct. 10, 2019

Related U.S. Application Data

(60) Provisional application No. 62/655,293, filed on Apr. 10, 2018.

(51) Int. Cl.

| | |
|---|---|
| *H04R 3/00* | (2006.01) |
| *H04R 1/10* | (2006.01) |
| *C25D 7/04* | (2006.01) |
| *B64D 43/00* | (2006.01) |

(52) U.S. Cl.
CPC ............. *H04R 3/007* (2013.01); *C25D 7/04* (2013.01); *H04R 1/1033* (2013.01); *H04R 1/1075* (2013.01); *B64D 43/00* (2013.01); *H04R 2201/105* (2013.01)

(58) Field of Classification Search
USPC .... 381/61, 74, 189, 190, 367, 370, 371, 385
See application file for complete search history.

(56) References Cited

U.S. PATENT DOCUMENTS

| | | | |
|---|---|---|---|
| 8,363,861 B2 * | 1/2013 | Hughes | H04N 5/64 348/61 |
| 9,625,545 B2 | 4/2017 | Dumoulin et al. | |
| 9,787,750 B2 | 10/2017 | Ziarati | |
| 2015/0222980 A1 * | 8/2015 | Pizzaro | H04R 1/1058 381/371 |
| 2016/0380333 A1 | 12/2016 | Uttermann et al. | |

FOREIGN PATENT DOCUMENTS

DE 102007042590 3/2009

* cited by examiner

*Primary Examiner* — Yosef K Laekemariam
(74) *Attorney, Agent, or Firm* — Edward M. Livingston, Esq.; Bryan L. Loeffler, Esq.; Livingston Loeffler, P.A.

(57) ABSTRACT

A set of shielded headphones (1) having speaker housings (6) that are electroplated to provide metallic surfaces to create a Faraday cage around each speaker (5) contained therein. The protective metallic encasement prevents electromagnetic radiation from interfering with the speakers.

18 Claims, 2 Drawing Sheets

SHIELDED HEADPHONES

CROSS-REFERENCE TO RELATED APPLICATION

This application claims priority to provisional application No. 62/655,293 filed on Apr. 10, 2018. The patent application identified above is incorporated herein by reference in its entirety to provide continuity of disclosure.

FIELD OF THE INVENTION

This invention relates to headphones used for listening to audio wherein the structure of the headphones eliminates electromagnetic interference, particularly when used in commercial aviation.

BACKGROUND OF THE INVENTION

Headphones are a set of small speakers worn on or around the head over a user's ears. They are electroacoustic transducers, which convert an electrical signal to a corresponding sound. Headphones let a single user listen to an audio source privately and are commonly used in commercial aviation to allow passengers on a plane to listen to movies, music and so forth independently without bothering fellow passengers.

Headphones on airplanes are commonly plugged into an audio system of the plane itself wherein grounding problems and other electrical systems of the plane can cause electromagnetic interference with the headphones. The electromagnetic interference reduces sound quality.

Therefore, a need exists for headphones that eliminate electromagnetic interference, particularly when used in commercial aviation.

SUMMARY OF THE INVENTION

The primary object of the present invention is to provide a set of shielded headphones used for listening to audio wherein the structure of the headphones eliminates electromagnetic interference particularly, when used in commercial aviation.

The present invention fulfills the above and other objects by providing a set of shielded headphones having speaker housings that are electroplated to create a Faraday cage around each speaker contained therein. The protective metallic encasement prevents electromagnetic radiation from interfering with the speakers.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
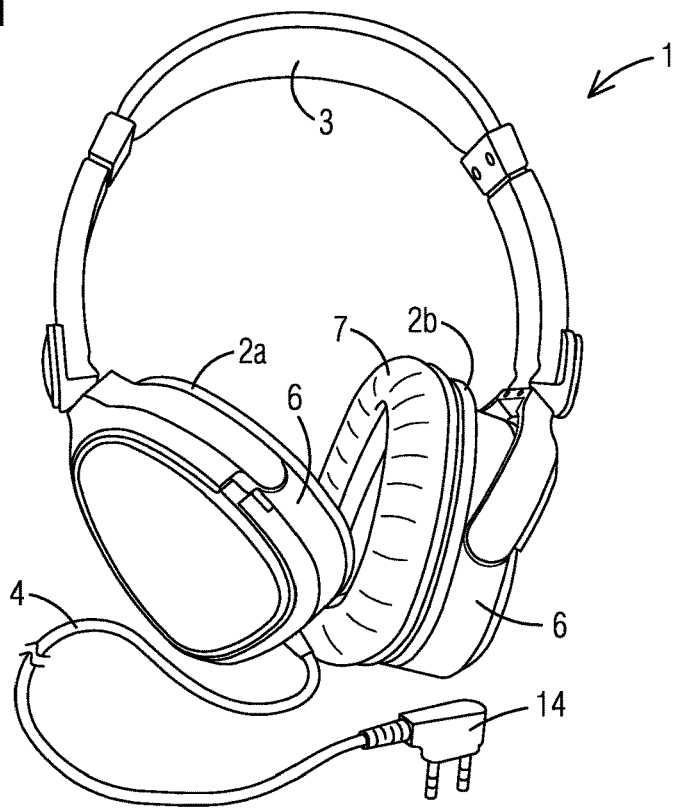
FIG. 1 is a perspective front view of a set of shielded headphones of the present invention.
Figure 2:
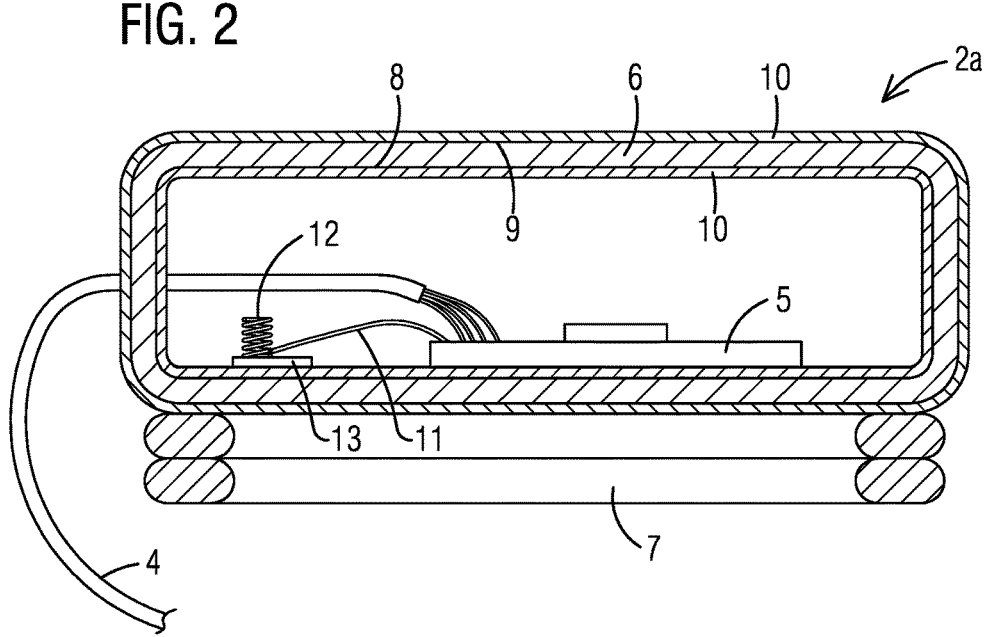
FIG. 2 is a sectional view along line A-A of FIG. 1 showing an electroplated inner surface of a right side ear cup of the headphones of the present invention.
Figure 3:
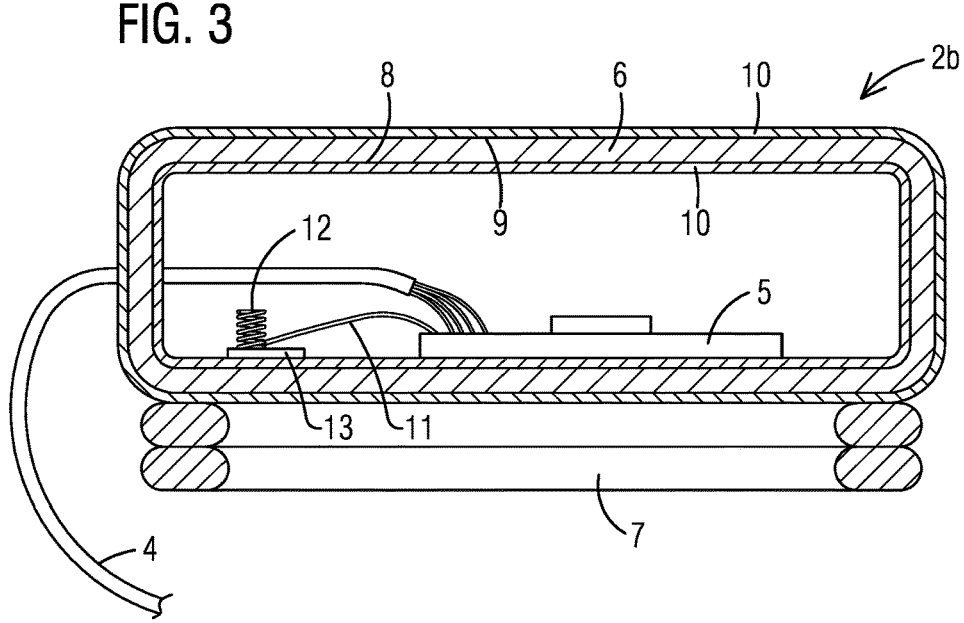
FIG. 3 is a sectional view along line B-B of FIG. 1 showing an electroplated inner surface of a left side ear cup of the headphones of the present invention.
Figure 4:
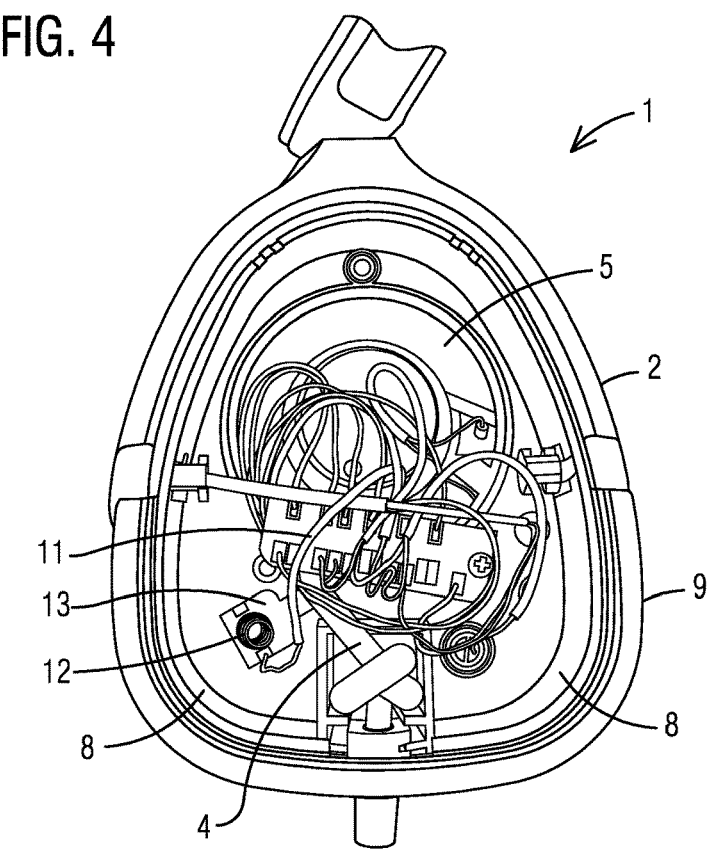
FIG. 4 is an internal view of an ear cup of the headphones of the present invention.

For purposes of describing the preferred embodiment, the terminology used in reference to the numbered accessories in the drawings is as follows:

1. shielded headphones, generally
2. ear cup
2a. right ear cup
2b. left ear cup
3. band
4. audio cable
5. speaker
6. housing
7. ear pad
8. inner surface of housing
9. outer surface of housing
10. layer of metal
11. ground wire
12. spring
13. tab
14. audio plug With reference to FIG. 1, a perspective front view of a set of shielded headphones 1 of the present invention is illustrated. The shielded headphones 1 of the present invention comprises at least one ear cup 2. As illustrated herein, a right ear cup 2a and a left ear cup 2b are connected by a resilient curved band 3 for pressing the right ear cup 2a and the left ear cup 2b against ears of a user while the set of shielded headphones 1 are being worn on the user's head. An audio cable 4 for supplying power and an audio signal to speakers 5 (as illustrated in FIGS. 2-4) located within the right ear cup 2 and the left ear cup 2b extends from the right ear cup 2 and/or the left ear cup 3. The right ear cup 2 and the left ear cup 2b each comprise a rigid housing 6 having an ear pad 7 located thereon that rest against a user's head and ear while the set of shielded headphones 1 being worn.

With reference to FIGS. 2 and 3, a sectional view along line A-A of FIG. 1 showing an electroplated inner surface 8 of a right side ear cup 2a of the set of shielded headphones 1 of the present invention and a sectional view along line B-B of FIG. 1 showing an electroplated inner surface 8 of a left side ear cup 2b of the set of shielded headphones 1 of the present invention, respectively, are illustrated. The right ear cup 2a and the left ear cup 2b each comprise a rigid housing 6 having an ear pad 7 located thereon that rest against a user's head and ear while the set of shielded headphones 1 are being worn. A speaker 5 is mounted within each the right ear cup 2a and the left ear cup 2b and is connected to the audio cable 4. The housings 6 of the right ear cup 2a and the left ear cup 2b each comprise an inner panel (on which the speaker is mounted), a perimeter wall an outer panel that all surround a rear portion of the speaker 5. The housings 6 of the right ear cup 2a and the left ear cup 2b each further comprise an inner surface 8 and an outer surface 9. As illustrated herein, a thin layer of metal 10 is located on the inner surface 8 and outer surfaces 9 of the right ear cup 2a and the left ear cup 2b. The thin layer of metal 10 is preferably applied to the inner surface 8 and outer surface 9 of the right ear cup 2a and the left ear cup 2b through electroplating. At least one ground wire 11 is connected to the housings 6 of the right ear cup 2a and the left ear cup 2b preferably via a spring 12 extending upward from a tab 13 connected to the housing 6. The at least one ground wire 11 is then connected to the audio cable 4 which is grounded to an audio output jack, such as an audio output jack located in an armrest of a seat of an airplane, in which a plug 14, as illustrated in FIG. 1, located on the audio cable 4 is plugged into.

With reference to FIG. 4, an exemplary internal view of an ear cup 2 of the set of shielded headphones 1 of the present invention is illustrated. A speaker 5 is mounted within ear cup and is connected to the audio cable 4. The housing 6 of the ear cup 2 comprises an inner panel (on which the speaker is mounted), a perimeter wall an outer panel that all surround a rear portion of the speaker 5. The housing of the ear cup 2 further comprises an inner surface 8 and an outer surface 9. As illustrated herein, a thin layer of metal 10 is located on the inner surface 8 and outer surface 9 of the ear cup 2. At least one ground wire 11 is connected to the housing 6 of the ear cup 2 preferably via a spring 12 extending upward from a tab 13 connected to the housing 6. The at least one ground wire 11 is then connected to the audio cable 4 which is grounded to an audio output jack It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, We claim:

1. A set of shielded headphones comprising:
at least one ear cup connected to a resilient curved band for pressing the at least one ear cup against a user's head while the set of shielded headphones are being worn;
said at least one ear cup comprising a rigid housing having an inner surface and an outer surface;
a speaker mounted within the rigid housing of said at least one ear cup;
said speaker being connected to at least one audio cable; and
a layer of metal applied to the inner surface of the rigid housing of said at least one ear cup, wherein the layer of metal applied to the inner surface of the rigid housing of said at least one ear cup is applied using electroplating.

2. The shielded set of headphones of claim 1 further comprising:
a layer of metal applied to the outer surface of the rigid housing of said at least one ear cup.

3. The shielded set of headphones of claim 2 wherein:
the layer of metal applied to the outer surface of the rigid housing of said at least one ear cup is applied using electroplating.

4. The shielded set of headphones of claim 1 wherein:
said rigid housing of said at least one ear cup further comprises an inner panel, a perimeter wall and an outer panel.

5. The shielded set of headphones of claim 4 wherein:
said speaker is mounted on the inner panel of the rigid housing of said at least one ear cup.

6. The shielded set of headphones of claim 1 further comprising:
at least one ground wire connected to the rigid housing of the at least one ear cup.

7. The shielded set of headphones of claim 6 further comprising:
said at least one ground wire being connected to said audio cable.

8. The shielded set of headphones of claim 6 further comprising:
said at least one ground wire being connected to the rigid housing via a spring extending upward from a tab.

9. The shielded set of headphones of claim 1 further comprising:
an ear pad located on the at least one ear cup.

10. A set of shielded headphones comprising:
a right ear cup and a left ear cup each connected to a resilient curved band for pressing the at right ear cup and left ear cup against a user's head while the set of shielded headphones are being worn;
said right ear cup comprising a rigid housing having an inner surface and an outer surface;
said left ear cup comprising a rigid housing having an inner surface and an outer surface; a speaker mounted within the rigid housing of said right ear cup;
a speaker mounted within the rigid housing of said left ear cup;
said speaker mounted within the rigid housing of said right ear cup being connected to at least one audio cable; said speaker mounted within the rigid housing of said left ear cup being connected to the at least one audio cable;
a layer of metal applied to the inner surface of the rigid housing of said right one ear cup; and a layer of metal applied to the inner surface of the rigid housing of said left one ear cup, wherein the layer of metal applied to the inner surface of the rigid housing of said right ear cup is applied using electroplating; and
the layer of metal applied to the inner surface of the rigid housing of said left ear cup is applied using electroplating.

11. The shielded set of headphones of claim 10 further comprising:
a layer of metal applied to the outer surface of the rigid housing of said right ear cup; and
a layer of metal applied to the outer surface of the rigid housing of said left ear cup.

12. The shielded set of headphones of claim 11 wherein:
the layer of metal applied to the outer surface of the rigid housing of said right ear cup is applied using electroplating; and
the layer of metal applied to the outer surface of the rigid housing of said left ear cup is applied using electroplating.

13. The shielded set of headphones of claim 10 wherein:
said rigid housing of said right ear cup further comprises an inner panel, a perimeter wall and an outer panel; and
said rigid housing of said left ear cup further comprises an inner panel, a perimeter wall and an outer panel.

14. The shielded set of headphones of claim 13 wherein:
said speaker mounted within the rigid housing of said right ear cup is mounted on the inner panel of the rigid housing of said right ear cup; and
said speaker mounted within the rigid housing of said left ear cup is mounted on the inner panel of the rigid housing of said left ear cup.

15. The shielded set of headphones of claim 10 further comprising:
at least one ground wire connected to the rigid housing of the right ear cup; and
at least one ground wire connected to the rigid housing of the left ear cup.

16. The shielded set of headphones of claim 15 further comprising:
   said at least one ground wire connected to the rigid housing of the right ear cup being connected to said audio cable; and
   said at least one ground wire connected to the rigid housing of the left ear cup being connected to said audio cable.

17. The shielded set of headphones of claim 6 further comprising:
   said at least one ground wire connected to the rigid housing of the right ear cup being connected to the rigid housing via a spring extending upward from a tab; and
   said at least one ground wire connected to the rigid housing of the left ear cup being connected to the rigid housing via a spring extending upward from a tab.

18. The shielded set of headphones of claim 10 further comprising:
   an ear pad located on the right ear cup; and
   an ear pad located on the left ear cup.

* * * * *